Dec. 9, 1952  R. E. CRYOR ET AL  2,620,513
METHOD OF AND APPARATUS FOR FORMING PIPE INSULATION
Filed March 8, 1950  2 SHEETS—SHEET 1
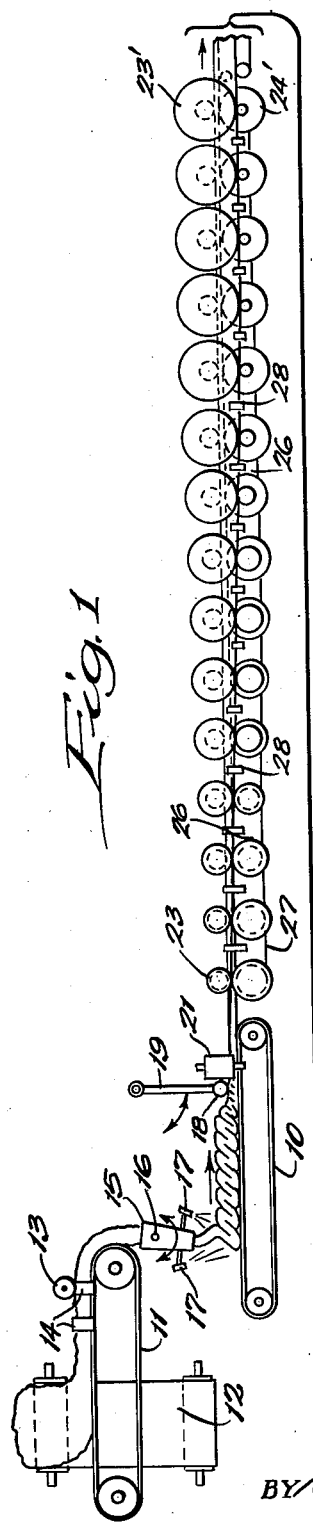
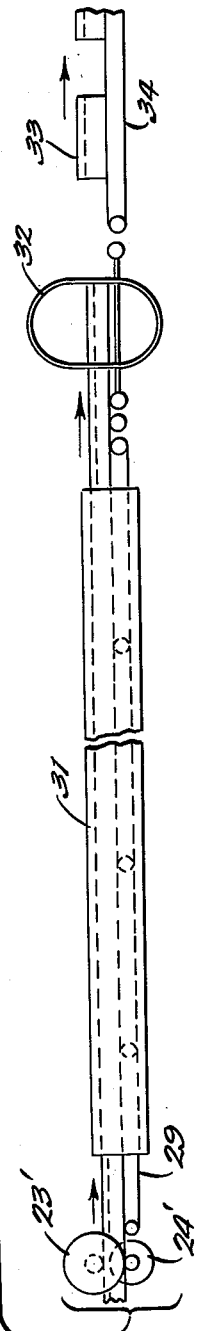
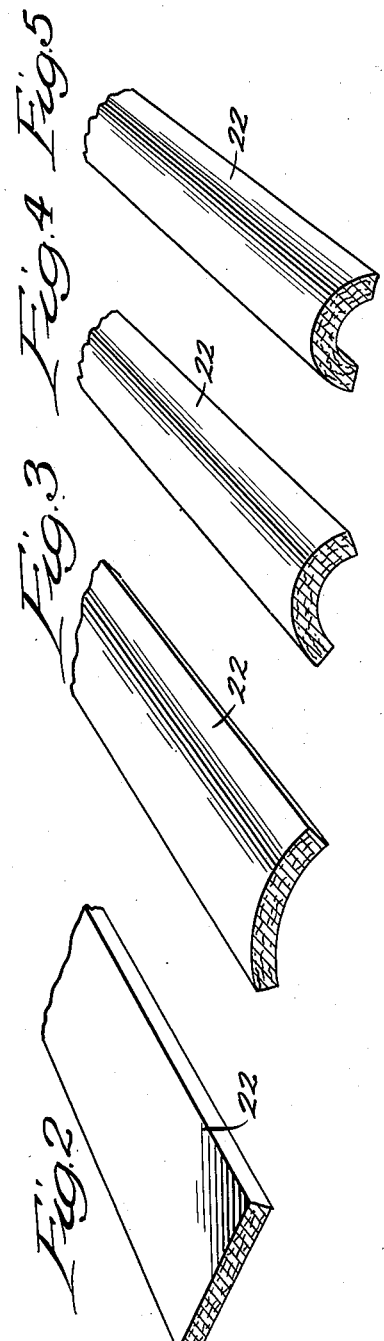
INVENTORS:
Robert E. Cryor
and Emil T. Johnson
BY Dawson, Ooms, Booth and Spangenberg
ATTORNEYS.

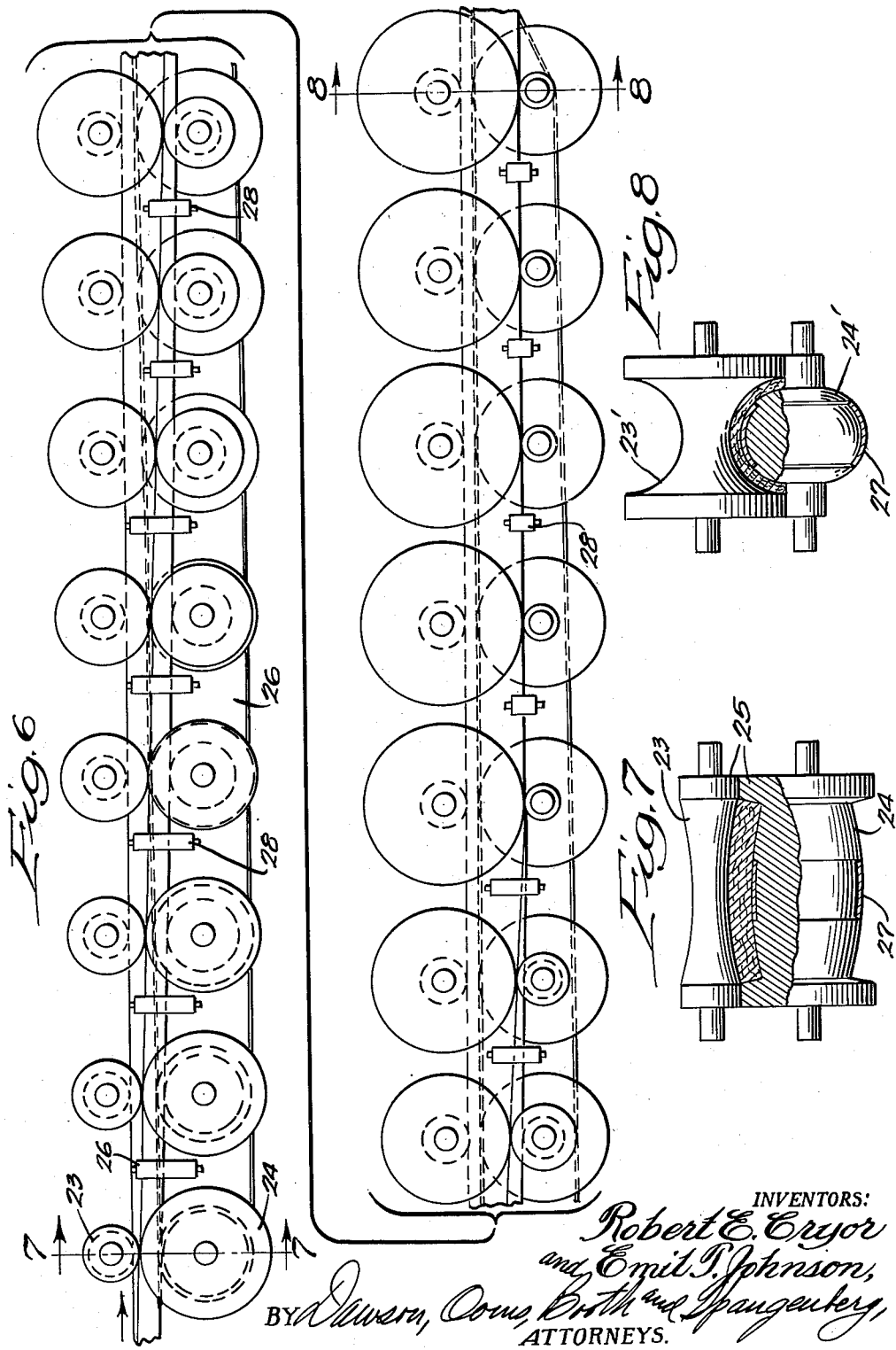

Patented Dec. 9, 1952

2,620,513

UNITED STATES PATENT OFFICE 2,620,513

METHOD OF AND APPARATUS FOR FORMING PIPE INSULATION

Robert E. Cryor, Western Springs, and Emil T. Johnson, La Grange, Ill., assignors to Union Asbestos & Rubber Company, Chicago, Ill., a corporation of Illinois Application March 8, 1950, Serial No. 148,306

9 Claims. (Cl. 18—9)

This invention relates to a method of, and apparatus for, forming a pipe insulation, and more particularly to the formation of relatively rigid semi-cylindrical sections of insulating material to be assembled about a pipe.

Rigid insulation of this type has been used extensively on pipes and is generally assembled by placing a series of semi-cylindrical sections on the pipe, preferably with the joints on opposite sides of the pipe in staggered relation and securing them in place by straps or similar fastenings. The customary procedure for making the insulating sections has been to build up a tube of insulating material and binder by molding the material while it is in plastic form or by rolling it on a mandrel, and after curing split the tube lengthwise to form two semi-cylindrical sections. This procedure is relatively slow and it is difficult in following it to form the sections with sufficient accuracy so that they can be used interchangeably and still obtain a proper fit on the pipe.

It is one of the objects of the present invention to provide a method of, and apparatus for, forming a pipe insulation in which semi-cylindrical sections of insulating material are formed in a continuous strip and are cut off to the desired section lengths.

Another object is to provide a method and apparatus in which a flat strip of insulating fibers and binder material is progressively bent to a semi-circular section, is cured, and is cut to the desired lengths.

Still another object is to provide a method and apparatus in which the flat strip is bent and finished by passing it progressively over sets of rollers of progressively decreasing radii of curvature. According to one feature, the strip is supported between the sets of rollers by a continuous conveyor belt supported on the rollers. Preferably side forming rollers are also employed between the sets of rollers to press the sides of the strip inward, thereby to assist in forming the strip without tearing the edges.

A further object is to provide a machine for forming pipe insulation in which a strip of insulating material is formed between sets of concavely and convexly curved rollers turning at different speeds to provide a smoothing or troweling effect. Preferably the convexly curved rollers carry a conveyor belt which determines the speed of travel of the strip and the concave rollers turn faster than the convex rollers.

A still further object is to provide a machine in which a strip of insulating material and binder is formed by spraying opposite sides of a layer of fiber with binder and disposing the layer in a series of folds. In one desired construction the layer is distributed in folds by an oscillating distributor head swinging parallel to a horizontal conveyor on which the strip is formed. After depositing the layer in folds, its thickness is preferably determined by an oscillating horizontal roller and its width by vertical side rollers.

The above and other objects and advantages of the invention will be more readily apparent from the following detailed description when read in connection with the accompanying drawings in which:

Figure 1 is a diagrammatic side elevation of a complete apparatus embodying the invention;

Figure 2 is a partial perspective view showing the form of the strip at the time it leaves the conveyor and before it enters the first forming rollers;

Figure 3 is a similar view showing the formation of the strip after leaving the first set of forming rollers;

Figure 4 is a similar view showing the formation of the strip after leaving an intermediate set of rollers;

Figure 5 is a similar view showing the formation of the strip after leaving the final set of rollers;

Figure 6 is an enlarged side elevation of the series of forming rollers;

Figure 7 is a transverse section on the line 7—7 of Figure 6, and Figure 8 is a transverse section on the line 8—8 of Figure 6.

In carrying out the invention, fibrous insulating material such as asbestos fibers, glass fibers, or mineral wool alone or mixed with organic fibers such as wool, cotton, rayon or the like are mixed with a binder such as sodium silicate, phenol formaldehyde resins or other types of binders, preferably in liquid, and formed into a flat, relatively thin, layer of the desired density. The layer is formed continuously to provide a relatively long, narrow strip which is then bent transversely into a semi-cylindrical section to provide semi-cylindrical lengths of pipe insulation.

As shown in Figure 1, the initial layer is formed on a horizontally traveling belt conveyor 10, onto which material is fed vertically from above. The loose fibrous insulating material is distributed in a layer on a second horizontal belt conveyor 11, located above the conveyor 10, to which the fibers are supplied by a third vertically extending conveyor 12. Suitable distributors may be provided at the discharge end of the conveyor 12 to spread the fibers evenly over the conveyor 11 and the layer of fibers may be confined by horizontal rollers 13 and vertical side rollers 14. This part of the apparatus is conventional equipment used in handling fibers in many other processes, and will not be further described herein.

The conveyor 11 discharges the layer of fibers into a distributor 15, which extends the full width of the conveyor belt 10 and which is pivotally mounted at 16 for oscillation parallel to the direction of travel of the conveyor 10. As shown, the layer of fibers travels from the conveyor 11 through the distributor and is discharged therefrom vertically downward onto the conveyor 10. The distributor carries spray nozzles 17 located on opposite sides of the layer of fibers to spray a binding material thereon as the fibers are discharged from the conveyor.

With the conveyors traveling and the distributor oscillating, the relatively thin layer of fibers discharged from the conveyor will be sprayed with binder on both sides thereof and will be laid on the conveyor 10 in a series of transverse folds, as illustrated. With this operation the binder is distributed uniformly throughout the mass of fibrous material so that a uniform, substantially homogeneous, mixture will result. Since the fibers as laid on the conveyor 10 are relatively loose, the mass is compressed to the desired thickness and is smothed on its upper surface by a horizontal roller 18, spaced above the conveyor 10, and mounted on a lever 19 for oscillation. This roller will compress the material to the desired final thickness and at the same time will smooth its upper surface to provide a strip of uniform thickness. Vertical rollers 21 are mounted adjacent the sides of the conveyor 10 to confine the side edges of the mixture. Due to the action of the roller 18 and side rollers 21, a strip as shown at 22 in Figure 2 of uniform width, thickness and density throughout will be provided at the discharge end of the conveyor 10.

This strip 22 is progressively bent by a series of sets of rollers into a semi-circular cross-section. As shown in Figures 1 and 6, there are 15 sets of rollers of progressively increasing curvature, gradually to bend the strip laterally. Since the strip at this time is relatively weak, it is necessary that it be bent gradually in order to avoid tearing and to provide a uniform end product.

As best seen in Figures 7 and 8, each of the sets of rollers comprises an upper roller 23 which is concavely curved along its length and which mates with a lower convexly curved roller 24. The rollers are provided with projecting side portions 25, which engage each other and are of such a diameter in their central portions as to leave a space in which the strip 22 may be received. It will be understood that each of the upper rollers is curved transversely about a progressively decreasing radius so that the final upper roller appears as shown at 23' in Figure 8 and the lower roller appears as shown at 24'. The intermediate rollers gradually increase in curvature from the minimum curvature of the first set shown in Figure 7 to the full semi-circular section shown in Figure 8. The rollers are mounted on a unitary, elongated frame 26 and are driven through belts or gearing in any desired manner, at the desired rate of speed.

Since the rollers must necessarily be spaced some distance apart and since the strip is relatively weak prior to curing, it is preferably supported between the rollers by a conveyor 27 carried between convex rollers and extending the full length of the sets of rollers. As shown in Figures 7 and 8, the convex rollers are grooved in their central portions to receive the conveyor 27 so that the conveyor's surface forms a smooth continuation of the roller surface to provide a smooth interior on the strip.

According to one feature of the invention, the upper concave rollers are driven at a higher rate of speed than the lower convex rollers to provide a smoothing or troweling effect on the strip as it travels through the rollers. The lower convex rollers are driven at such speeds that their peripheral velocities at their longitudinal centers will be the same as the linear velocity of the belt 27 and may, if desired, be driven by the belt. Thus the strip will travel through the sets of rollers at a rate determined by the rate of speed of the lower convex rollers and the conveyor belt. The upper concave rollers will preferably be driven in a direction opposite to the convex rollers so that their surfaces which engage the strip are traveling in the same direction as the strip but at a higher velocity. We have found that very desirable results can be obtained by driving the upper rollers at a speed approximately ten times that of the lower rollers so that they will wipe over the strip and will smooth its upper surface. This produces a smooth, uniform end product having a desirable appearance as well as the desired insulating properties.

In addition to the sets of forming rollers just described, the frame 26 preferably carries vertical sets of rollers 28, arranged between the sets of forming rollers to engage the side edges of the strip. The rollers 28 are progressively spaced decreasing distances apart so that the distance between them is approximately equal to the desired width of the strip as it enters the next succeeding set of forming rollers. The vertical rollers 28 thus assist in bending the strip and causing it to be fed properly into the forming rollers so that there will be no sudden decreases in strip width which might result in tearing or roughening the edges of the strip.

From the forming rollers the formed strip is received on a horizontally traveling conveyor belt 29, which extends through a curing chamber or oven 31. As shown in Figure 1, the oven 31 is in the form of an elongated tube which may be heated in any desired manner and through which air may be circulated to dry and cure the binder. The oven may be made of any desired length so that the curing operation will be completed with the strip traveling at the desired rate. As it leaves the oven the strip will be completely cured to a rigid, or semi-rigid, condition and will form a continuous semi-cylindrical strip of the general formation shown in Figure 5.

Upon leaving the curing oven the strip is cut to the desired lengths by a traveling cut off saw 32 which may move longitudinally with the strip during the cutting operation so that square-cut ends will result. Since this cut off saw is a conventional piece of apparatus, it is indicated only diagrammatically in Figure 1.

After being cut off, the semi-circular sections as indicated at 33 in Figure 1 may be conveyed away on a conveyor belt 34 to a desired point of storage, shipment, or use.

By the present invention semi-cylindrical, rigid insulating sections can be formed rapidly and with the necessary degree of accuracy to be used interchangeably in insulating pipes. It will be noted that the size and formation of the strip is accurately determined by the interfitting engagement of the forming rollers as illustrated in Figures 7 and 8, and that the strip is cured while retained in this formation on the belt 29.

While the invention has been described in connection with one specific apparatus for carrying it out, it will be understood that this apparatus is shown for purposes of illustration only and is not to be taken as a definition of the scope of the invention, reference being had for this purpose to the appended claims.

What is claimed is:

1. The method of forming pipe insulation which comprises mixing fibrous material and a binder, continuously forming the mixture into an elongated flat strip, bending the strip transversely of its length into a semi-circular section, curing the strip while maintaining the strip in semi-cylindrical shape and cutting the strip into a series of semi-cylindrical lengths.

2. Apparatus for forming pipe insulation comprising means for mixing fibrous material and a binder, means to form the mixture into a flat strip, a conveyor to feed the strip lengthwise, a series of sets of curved rollers of progressively decreasing radius to receive the strip and bend it progressively into a semi-circular section, each set including a pair of complementary rollers with their surfaces uniformly spaced throughout the roller length one of which has a convex curved surface and the other of which has a concave curved surface, and projecting side portions at the ends of the rollers engaging each other to confine the edges of the strip.

3. Apparatus for forming pipe insulation comprising a horizontal conveyor, means to deposit on the conveyor a mixture of fibrous material and binder, a horizontal roller above the conveyor to flatten the mixture into a flat strip, vertical rollers at the sides of the conveyor to smooth the edges of the strip, a series of curved rollers receiving the strip from the conveyor to bend it into a semi-circular cross section, vertical rollers between the curved rollers engaging the edges of the strip to hold it in bent condition, and means to cure the bent strip.

4. In an apparatus for forming pipe insulation, a plurality of sets of rollers of progressively decreasing radius of curvature, each set including a convexly curved roller and a complementary concavely curved roller to receive a strip between them and progressively bend it to a semi-circular cross section, and vertical rollers between the sets adjacent to the ends thereof to press the sides of the strip inward as it travels along the rollers.

5. In an apparatus for forming pipe insulation, a plurality of sets of rollers of progressively decreasing radius of curvature, each set including a convexly curved roller and a complementary concavely curved roller to receive a strip between them and progressively bend it to a semi-circular cross section, and means to drive the concave and convex rollers of the sets at different speeds.

6. In an apparatus for forming pipe insulation, a plurality of sets of rollers of progressively decreasing radius of curvature, each set including a convexly curved roller and a complementary concavely curved roller to receive a strip between them and progressively bend it to a semi-circular cross section, a conveyor belt extending over the convex rollers to support the strip between the sets of rollers, means to drive the convex rollers at speeds to move the conveyor belt and the strip at a desired velocity, and means to drive the concave rollers at higher speeds than the convex rollers.

7. The method of forming pipe insulation which comprises mixing fibrous material and a binder, continuously forming the mixture into an elongated flat strip, progressively bending the strip from flat to semi-circular form transversely of its length, wiping at least one surface of the strip during bending to produce a troweling effect thereon, curing the strip and cutting the strip into lengths.

8. The method of forming pipe insulation which comprises mixing fibrous material and a binder, continuously forming the mixture into an elongated flat strip, of uniform thickness throughout its width, progressively bending the strip from flat to semi-circular form transversely of its length, confining the edges of the strip during bending to maintain the strip of uniform thickness from one edge to the other, curing the bent strip, and cutting the cured strip into lengths.

9. The method of forming pipe insulation which comprises mixing fibrous material and a binder, continuously forming the mixture into an elongated flat strip, of uniform thickness throughout its width, progressively bending the strip from flat to semi-circular form transversely of its length, confining the edges of the strip during bending to maintain the strip of uniform thickness from one edge to the other, wiping at least one surface and the edges of the strip to produce a troweling effect thereon, curing the bent strip, and cutting the cured strip into lengths.

ROBERT E. CRYOR.
EMIL T. JOHNSON.

REFERENCES CITED

The following references are of record in the file of this patent:

UNITED STATES PATENTS

| Number | Name | Date |
|---|---|---|
| 775,541 | McConnell | Nov. 22, 1904 |
| 775,849 | McConnell | Nov. 22, 1904 |
| 1,023,473 | Lappen | Apr. 16, 1912 |
| 1,852,451 | Everett | Apr. 5, 1932 |
| 1,952,208 | Hussey | Mar. 27, 1934 |
| 2,019,417 | King | Oct. 29, 1935 |
| 2,500,690 | Lannan | Mar. 14, 1950 |
| 2,554,963 | Stafford | May 29, 1951 |